United States Patent [19]

Kosinska et al.

[11] Patent Number: 4,687,799

[45] Date of Patent: Aug. 18, 1987

[54] COMPOSITIONS OF POLYPHENYLENE OXIDE OR OF MIXTURES OF POLYPHENYLENE OXIDE WITH A STYRENE POLYMER

[75] Inventors: Wanda Kosinska; Dorota Grzelak; Irena Penczek; Jan Bialy, all of Warsaw, Poland

[73] Assignee: Enichem, S.p.A., Milan, Italy

[21] Appl. No.: 911,788

[22] Filed: Sep. 26, 1986

Related U.S. Application Data

[63] Continuation of Ser. No. 677,229, Dec. 3, 1984, abandoned.

[30] Foreign Application Priority Data

Dec. 5, 1983 [IT] Italy ............................ 24023 A/83

[51] Int. Cl.$^4$ .......................... C08K 5/11; C08K 5/34
[52] U.S. Cl. .................................. 524/100; 524/302; 524/331; 524/508

[58] Field of Search ............... 524/100, 302, 331, 508

[56] References Cited

U.S. PATENT DOCUMENTS

| | | | |
|---|---|---|---|
| 3,205,193 | 9/1965 | Dexter et al. | 524/100 |
| 3,255,191 | 6/1966 | Dexter | 524/100 |
| 3,257,354 | 6/1966 | Dexter | 524/100 |
| 3,968,078 | 7/1976 | Ramey et al. | 524/100 |
| 4,299,757 | 11/1981 | Kuribayashi et al. | 524/505 |

*Primary Examiner*—Harold D. Anderson
*Assistant Examiner*—Kriellion Morgan

[57] ABSTRACT

Thermally stable compositions, also showing high fluidity in the molten state comprise polyphenylene oxide, or a mixture of polyphenylene oxide with a styrene polymer, and a stabilizer system consisting of 2,4-bis(n-octylthio)-6-(4-hydroxy-3,5-di-tert.butylanilino)-1,3,5-triazine and dilauryl thiopropanoate.

6 Claims, No Drawings

4,687,799

COMPOSITIONS OF POLYPHENYLENE OXIDE OR OF MIXTURES OF POLYPHENYLENE OXIDE WITH A STYRENE POLYMER

This is a continuation, of application Ser. No. 677,299 filed Dec. 3, 1984 now abandoned.

DISCLOSURE

The present invention relates to thermally stable compositions, with high fluidity in the molten state, of polyphenylene oxide or of mixtures of polyphenylene oxide with a styrene polymer.

Polyphenylene oxide is a thermoplastic polymer, with superior technical properties, obtained by means of the oxidative polymerisation of 2,6-xylenol. Said polyphenylene oxide is, used as mixtures with polymers and copolymers of styrene.

The blending of these polymers allows a mutual improvement of chemical-physical characteristics according to the blending ratios of the polyphenylene oxide to the styrene polymer, polyphenylene oxide can be obtained, with improved impact strength and better workability, or styrene polymers with increased heat and flame resistance, better impact strength and improved mechanical characteristics.

It is known and customary in the art to improve the thermal stability characteristics of polyphenylene oxide, or of its mixtures with styrene polymers, by means of the addition of stabilizers and/or antioxidative agents. For this purpose, several compounds are used, such as organic phosphites and phosphates, diphenylamine derivatives, mercaptobenzimidazole, hexamethylene phosphoramide, monohydroxydithiopropanoates and aliphatic alcohols, such as e.g. disclosed in U.S. Pat. Nos. 3,816,562 and 4,002,701 and in Polish Pat. Nos. 68,784 and 68,791.

Another need felt in the art is to have available polymers, or polymer blends, provided with high fluidity in the molten state, so as to make processing easier. It is therefore desirable that additives be available, capable of conferring such characteristics to said polymers or polymer blends.

The present invention is essentially based on the rather unexpected observation that a particular combination of stabilizer agents is capable of imparting to polyphenylene oxide, or to blends of it with a styrene polymer, the characteristics of thermal stability, and flow characteristics in the molten state.

Accordingly, the present invention relates to thermally stable compositions, also provided with high fluidity in the molten state, comprising polyphenylene oxide, or a mixture of polyphenylene oxide with a styrene polymer, and a stabilizer system consisting of 2,4-bis(n-octylthio)-6-(4-hydroxy-di-tert.butylanilino)-1,3,5-triazine and of dilauryl thiopropanoate, said components of the stabilizer system being each present in a quantity of from 0.1 to 3 parts by weight per 100 parts by weight of polymer of polymer blend.

Styrene polymers, that are useful for the purposes of the present invention, are those derived from the homopolymerization of styrene and α-methylstyrene, or from the copolymerization of these monomers with each other, or with other monomers, such as acrylonitrile, methacrylonitrile, acryl and methacryl esters. Other styrene polymers which can be used are those obtained by grafting styrene, alone or with other monomers selected from those listed above, on diene based rubber, or mixtures of polystyrene with elastomers, the polystyrene component being the main component of said mixtures.

The polymer mixtures, according to the present invention, contain generally the polyphenylene oxide in quantities of from 1 to 99% by weight, per 100 parts by weight of the polymer blend.

It is indeed possible, depending on the performances intended for the polymer composition, to obtain compositions with high mechanical characteristics, by using low percent levels of the polymer of styrene; obtaining, in other terms, a "modified" polyphenylene oxide; or compositions with lower mechanical performances, by using high percentages of styrene polymers, i.e., obtaining a "modified" polystyrene.

Polymer blends which show a desired plurality of characteristics, such as: high mechanical performances, good workability, good thermal stability and acceptable anti-flame characteristics, are those which contain about equal percentages of polyphenylene oxide and of styrene polymer, which are acceptable from the economical point of view.

The stabilizer agents, which comprise the stabilizer systems of the present invention, are 2,4-bis(n-octylthio)-6-(4-hydroxy-3,5-di-tert.butylanilino)-1,3,5-triazine, and dilauryl thiopropanoate.

As previously stated, such stabilizer agents are active in quantities of from 0.1 to 3 parts by weight per 100 parts by weight of polyphenylene oxide or of blends of this with a styrene polymer. The best results are achieved with quantities of each stabilizer agent of the order of 0.5 parts by weight per 100 parts by weight of said polymer or polymer mixture.

It should be noted that when these stabilizer agents are used separately, only minor improvements are achieved of the characteristics of thermal stability and of fluidity in the molten state. A synergistic effect is obtained only by means of the joint use of the two stabilizers, especially with weight ratios of the 2,4-bis(n-octylthio)-6-(4-hydroxy-3,5-di-tert.butylanilino)-1,3,5-triazine and dilauryl thiopropanoate within the range of values of from 0.1:1 to 2:1, and preferably of the order of 1:1.

Said stabilizer agents can be incorporated into the polyphenylene oxide, or into its blends with styrene polymers, by using any process known this purpose. In any case, the addition of the stabilizer system according to the present invention involves an increase of the decomposition temperature, a decrease of the rate of oxidation reactions and an improvement of the fluidity characteristics under the normal working conditions and transformation conditions of the polymer, or of its mixtures.

For the following experimental Examples, a polyphenylene oxide is used, which was obtained by means of the oxidative polymerization of 2,6-xylenol, in the presence of a catalyst of cupric chloride complexed with an organic base, operating in toluene solution, having a weight average molecular weight (Mw) of about 33,000, and a numerical molecular weight (Mn) of about 17,000.

In said Examples, a styrene polymer is moreover used of the impact resistant type, sold under the Trade Name RESTIROLO® 673F, of ENOXY, containing 8.4% by weight of polybutadiene rubber, and a flow index of 4.5 g/10′.

The thermal stability of the compositions of polyphenylene oxide compositions, and of the compositions of blends of it with polystyrene is evaluated at the constant temperature for 280° C., by means of the thermogravimetric essay using a Sartorius microscale. The maximum quantity is determined in this way of absorbed oxygen, which is expressed as the highest weight percent increase of the polymer or polymer mixture composition.

The fluidity of the compositions of polyphenylene oxide and of its blends with polystyrene is evaluated by means of the flow index of the molten composition. In particular, the assay is carried out in a plastometer, by operating at 300° C. for the compositions of polyphenylene oxide, and at 280° C. for the compositions of the mixtures of polyphenylene oxide with polystyrene. In any case, a load is used of 10 kg, with a die with orifice dimensions of 2.1 mm in diameter and 8 mm in length. The results are expressed in g/10'.

EXAMPLE 1

Polyphenylene oxide (100 parts by weight), 2,4-bis(n-octylthio)-6-(4-hydroxy-3,5-di-tert.butylanilino)-1,3,5-triazine (0.5 parts by weight) and dilaurylthiopropanoate (0.5 parts by weight) are blended and homogenized by means of a ball mill.

The powder composition so obtained is submitted to the essays described hereinabove, and the results of such essays are shown in Table 1, as follows.

In said Table the results are also shown, for comparison purposes, which are obtained by using polyphenylene oxide alone, and a composition of polyphenylene oxide with 2,4-bis(n-octylthio)-6-(4-hydroxy-3,5-di-tert.butylanilino)-1,3,5-triazine as the only stabilizer agent.

TABLE 1

| Test No | Composition | Parts by weight | Maximum weight increase (% by weight) | Flow index 300° C. (g/10') |
|---|---|---|---|---|
| 1 | Polyphenylene oxide | 100 | 3.4 | 0,05 |
| 2 | Polyphenylene oxide | 100 | 2.4 | 0,10 |
|   | OTA (*) | 1 |  |  |
| 3 | Polyphenylene oxide | 100 | 1.0 | 0.3 |
|   | OTA (*) | 0,5 |  |  |
|   | dilauryl thiopropanoate | 0,5 |  |  |

(*) OTA = 2,4-bis(n-octylthio)-6-(4-hydroxy-3,5-di-tert.-butylanilino)-1,3,5-triazine.

EXAMPLE 2

Polyphenylene oxide (50 parts by weight), polystyrene (50 parts by weight), 2,4-bis(n-octylthio)-6-(4-hydroxy-3,5-di-tert.butylanilino)-1,3,5-triazine (0.5 parts by weight) and dilauryl thiopropanoate (0.5 parts by weight) are blended and homogenized in a ball mill.

The powder composition so obtained is submitted to the essays described hereinabove, and the results are shown in the following Table.

In the Table are also shown, for comparison purposes, the results obtained with the mixture of polyphenylene oxide and polystyrene alone, and with a composition of such mixture with 2,4-bis(n-octylthio)-6-(4-hydroxy-3,5-di-tert.butylanilino)-1,3,5-triazine as the only stabilizer agent.

TABLE 2

| Test No | Composition | Parts by weight | Maximum weight increase (% by weight) | Flow index 280° C. (g/10') |
|---|---|---|---|---|
| 1 | Polyphenylene oxide | 50 | 1.5 | 4.5 |
|   | Polystyrene | 50 |  |  |
| 2 | Polyphenylene oxide | 50 | 0.8 | 5.6 |
|   | Polystyrene | 50 |  |  |
|   | OTA (*) | 1 |  |  |
| 3 | Polyphenylene oxide | 50 | 0.2 | 6.2 |
|   | Polystyrene | 50 |  |  |
|   | OTA (*) | 0,5 |  |  |
|   | Dilauryl thiopropanoate | 0,5 |  |  |

(*) OTA = 2,4-bis(n-octylthio)-6-(4-hydroxy-3,5-di-tert.-butylanilino)-1,3,5-triazine.

We claim:

1. Thermally stable compositions, also showing characteristics of high fluidity in the molten state, comprising polyphenylene oxide, or blends of polyphenylene oxide with a styrene polymer, and a stabilizer system consisting of 2,4-bis(n-octylthio)-6-(4-hydroxy-3,5-di-tert.butylanilino)-1,3,5-triazine and dilauryl thiopropanoate, said components of the stabilizer system being each present in a quantity of from 0.1 to 3 parts by weight per 100 parts by weight of polymer or of polymer blend.

2. Compositions as claimed in claim 1, characterized in that said polymer of styrene is selected from homopolymers of styrene and of α-methylstyrene, and the copolymers of such monomers with each other or with monomers selected from acrylonitrile, methacrylonitrile, acrylic and methacrylic esters, or from the polymers obtained by grafting of styrene, alone or together with other monomers selected from those listed above, on a diene base rubber, or from mixtures of polystyrene with elastomers, the polystyrene component of said mixtures being the main component of such mixtures.

3. Compositions as claimed in claim 1, characterized in that in the polymer blend polyphenylene oxide is present in a quantity of from 1 to 99 parts by weight per 100 parts by weight of the same blend.

4. Compositions as claimed in claim 1, characterized in that the 2,4-bis(n-octylthio)-6-(4-hydroxy-3,5-di-tert.butylanilino)-1,3,5-triazine and the dilauryl thiopropanoate are in quantities of the order of 0,5 parts by weight per 100 parts by weight of polymer or of polymer blend.

5. Compositions as claimed in claim 1, characterized in that the weight ratio of the 2,4-bis(n-octylthio)-6-(4-hydroxy-3,5-di-tert.butylanilino)-1,3,5-triazine to the dilauryl thiopropanoate is comprised within the range of values of from 0.1:1 to 2:1.

6. Compositions as claimed in claim 5, characterized in that said weight ratio is of the order of 1:1.

* * * * *